US007717354B1

(12) United States Patent
Robinson

(10) Patent No.: US 7,717,354 B1
(45) Date of Patent: May 18, 2010

(54) CLEANING SYSTEM INCLUDING OPERATOR-WEARABLE COMPONENTS

(75) Inventor: Robert S. Robinson, Hamilton, OH (US)

(73) Assignee: Kaivac, Inc., Hamilton, OH (US)

( * ) Notice: Subject to any disclaimer, the term of this patent is extended or adjusted under 35 U.S.C. 154(b) by 448 days.

(21) Appl. No.: 11/195,490

(22) Filed: Aug. 2, 2005

Related U.S. Application Data

(60) Provisional application No. 60/598,007, filed on Aug. 2, 2004.

(51) Int. Cl.
*A01G 25/09* (2006.01)
*B05B 17/00* (2006.01)

(52) U.S. Cl. .......................... 239/1; 239/152; 239/153; 239/157; 239/289; 239/310; 239/318; 239/375; 239/317

(58) Field of Classification Search ................. 239/152, 239/153, 154, 310, 318, 317, 375, 1, 289; 15/320–323
See application file for complete search history.

(56) References Cited

U.S. PATENT DOCUMENTS

| | | | | | |
|---|---|---|---|---|---|
| 1,138,500 | A | | 5/1915 | Naylor | |
| 1,169,587 | A | | 1/1916 | Wold | |
| 2,911,157 | A | * | 11/1959 | Converse | 239/754 |
| 3,128,949 | A | | 4/1964 | Kaufman | |
| 3,165,774 | A | * | 1/1965 | Barba | 15/323 |
| 3,219,278 | A | | 11/1965 | Santarelli | |
| 3,262,146 | A | * | 7/1966 | Hays | 15/321 |
| 3,770,205 | A | * | 11/1973 | Proctor et al. | 239/317 |
| 3,863,843 | A | | 2/1975 | Hechler, IV | |
| 3,883,301 | A | * | 5/1975 | Emrick et al. | 8/158 |
| 3,940,065 | A | * | 2/1976 | Ware et al. | 239/146 |
| 4,069,541 | A | * | 1/1978 | Williams et al. | 15/321 |
| 4,162,764 | A | * | 7/1979 | Millsap | 239/152 |
| 4,329,756 | A | * | 5/1982 | Chicoine et al. | 15/321 |
| 4,349,157 | A | * | 9/1982 | Beiswenger et al. | 239/509 |
| 4,369,921 | A | * | 1/1983 | Beiswenger et al. | 239/317 |
| 4,407,454 | A | * | 10/1983 | Massey | 239/154 |
| 4,475,689 | A | * | 10/1984 | Hauger et al. | 239/318 |
| 4,541,568 | A | | 9/1985 | Lichfield | |
| 4,583,688 | A | * | 4/1986 | Crapser | 239/314 |
| 4,585,168 | A | | 4/1986 | Even et al. | |
| 4,596,061 | A | * | 6/1986 | Henning | 15/322 |
| 4,834,293 | A | | 5/1989 | Lichfield | |
| 4,903,864 | A | * | 2/1990 | Sirhan | 222/78 |
| 4,925,105 | A | * | 5/1990 | Lin | 239/154 |
| 4,956,891 | A | * | 9/1990 | Wulff | 15/320 |
| 4,967,960 | A | * | 11/1990 | Futrell | 239/148 |
| 4,969,603 | A | | 11/1990 | Norman | |

(Continued)

*Primary Examiner*—Dinh Q Nguyen
(74) *Attorney, Agent, or Firm*—David E. Pritchard

(57) ABSTRACT

A cleaning system of the invention may include an operator wearable torso belt, a swivel hook fastened to the belt, and a holder releasably hung on the hook, with the holder sized to releasably hold a chemical container. The cleaning system further may include a chemical container, a spray gun, a chemical draw line connecting the chemical container to the spray gun, and a liquid supply line extending from a multi-functional cleaning machine to the spray gun. If desired, the chemical holder may include a first compartment, a second compartment, and a third compartment. The first compartment holds the spray gun when the spray gun is not in use, the second compartment holds the chemical container, and the third compartment is sized to hold a tool such as a squeegee or the like.

22 Claims, 3 Drawing Sheets

U.S. PATENT DOCUMENTS

| | | | | | |
|---|---|---|---|---|---|
| D341,872 | S | | 11/1993 | Anderson | |
| 5,263,223 | A | * | 11/1993 | Fiegel et al. | 15/321 |
| 5,301,386 | A | * | 4/1994 | Thomas et al. | 15/321 |
| 5,303,847 | A | * | 4/1994 | Cottone | 222/78 |
| 5,344,074 | A | | 9/1994 | Spriggs et al. | |
| 5,419,495 | A | * | 5/1995 | Berfield | 239/305 |
| 5,465,456 | A | * | 11/1995 | Fellhauer et al. | 15/320 |
| 5,775,590 | A | * | 7/1998 | Utter | 239/152 |
| 5,862,948 | A | * | 1/1999 | Duchon et al. | 222/133 |
| 5,964,415 | A | * | 10/1999 | Hadar | 239/317 |
| 5,967,415 | A | * | 10/1999 | Utter | 239/152 |
| 6,017,163 | A | * | 1/2000 | Keppers et al. | 401/48 |
| 6,179,224 | B1 | * | 1/2001 | Huesken | 239/152 |
| 6,182,911 | B1 | | 2/2001 | Hanks et al. | |
| 6,206,980 | B1 | * | 3/2001 | Robinson | 134/21 |
| 6,260,232 | B1 | * | 7/2001 | Nelson et al. | 15/322 |
| 6,386,293 | B1 | | 5/2002 | Bartlett | |
| 6,524,173 | B1 | * | 2/2003 | Nelson et al. | 451/178 |
| 6,769,628 | B1 | * | 8/2004 | Vaage et al. | 239/152 |
| 6,772,966 | B2 | * | 8/2004 | Foster et al. | 239/581.2 |
| 6,880,191 | B2 | * | 4/2005 | Bristor | 8/148 |
| 2001/0014987 | A1 | * | 8/2001 | Lesco et al. | 8/158 |
| 2001/0039684 | A1 | * | 11/2001 | Kasper et al. | 8/147 |
| 2001/0040190 | A1 | * | 11/2001 | Utter | 239/152 |
| 2002/0162904 | A1 | | 11/2002 | Worm | |
| 2002/0175222 | A1 | * | 11/2002 | Vaage | 239/153 |
| 2003/0150936 | A1 | * | 8/2003 | Bristor | 239/307 |

* cited by examiner

CLEANING SYSTEM INCLUDING OPERATOR-WEARABLE COMPONENTS

CROSS-REFERENCE RELATED APPLICATION

This application claims the benefit of the filing date of U.S. Patent Application No. 60/598,007, entitled "Cleaning System Including Operator-Wearable Components" and filed on Aug. 2, 2004. The entire disclose of U.S. Patent Application No. 60/598,007 is incorporated into this patent document by reference.

BACKGROUND OF THE INVENTION

1. Field of the Invention

This invention is directed to portable cleaning systems, and in particular, to such systems that enable a user to selectively deliver, through a spray gun or the like, a pressurized liquid (for example, water) and a mixture of such a liquid and a cleaning liquid (for example, a cleaning liquid concentrate).

2. Description of Related Art

Over the years, several cleaning devices have been proposed for use in cleaning various areas of commercial, industrial, and institutional buildings. In recent times, cleaning machines have been developed that are more operator-friendly and that are more efficient and effective. One such machine includes an onboard chemical injector fluidly connected to an onboard chemical concentrate and to a source of pressurized liquid (Robinson U.S. Pat. No. 6,206,980). And while this machine performs extremely well, there is a desire to make a cleaning system that is even more operator-friendly, efficient and effective.

SUMMARY OF THE INVENTION

One aspect of the invention is directed to a cleaning system comprising a floor supported portable cleaning machine, as well as other components. The cleaning machine includes: a fresh liquid tank operable to contain a liquid; a waste recovery tank; a fresh liquid pump operable to pump a liquid from the fresh liquid tank; and a vacuum source for enabling a soil-containing fluid to be vacuumed into the waste recovery tank. Additional components of the cleaning system include a sprayer connectable to the fresh liquid tank, and a container connectable to the sprayer. The container is operable to hold a chemical material for delivery to the sprayer, and is wearable by an operator. Accordingly, when the fresh liquid tank contains a liquid and the container holds a chemical material, an operator may, remote from the cleaning machine, wear the container, spray a liquid from the fresh liquid source through the sprayer, and spray a chemical material from the container through the sprayer. If desired, the sprayer may be, or may include, a spray gun.

The cleaning system also may include support structure operable to assist an operator in wearing the container. The support structure may include an operator-wearable torso belt, and also may include a fastener. If desired, the fastener may include a hook. The support structure may further include a holder operable to hold the container, with the holder being connectable to the belt. If the support structure includes a hook, then the holder may be hung on the hook. In addition, the holder may be constructed so as to hold the sprayer.

Another aspect of the invention is directed to a cleaning system comprising: fresh liquid delivery structure; waste recovery structure; a vacuum source for enabling a soil-containing fluid to be vacuumed into the waste recovery structure; a sprayer connectable to the fresh liquid delivery structure; and a container connectable to the sprayer. The container is operable to hold a chemical material for delivery to the sprayer, and is wearable by an operator. In this fashion, when the fresh liquid delivery structure contains a liquid and the container holds a chemical material, an operator may, remote from the fresh liquid delivery structure, wear the container, spray a liquid from the fresh liquid delivery structure through the sprayer, and spray a chemical material from the container through the sprayer.

A further aspect of the invention is directed to a cleaning system for use with a source of pressurized liquid and a sprayer. The cleaning system includes a user-wearable torso belt and a holder releasably connectable to the torso belt. The holder is adapted to releasably hold a chemical container fluidly connectable to a chemical injector and a sprayer. If desired, the holder may include a first compartment adapted to releasably hold a sprayer, and a second compartment adapted to releasably hold the chemical container. Accordingly, an operator may, remote from the source of pressurized liquid, wear the container, spray a liquid from the fresh liquid source through the sprayer, and spray a chemical material from the container through the sprayer.

BRIEF DESCRIPTION OF THE DRAWINGS

The accompanying drawings, which are incorporated, and constitute a part of this specification, illustrate embodiments of the invention, and, together with the general description of the invention given above, and the detailed description of the drawings given below, serve to explain the principles of the invention.

DETAILED DESCRIPTION OF THE DRAWINGS

Figure 1:
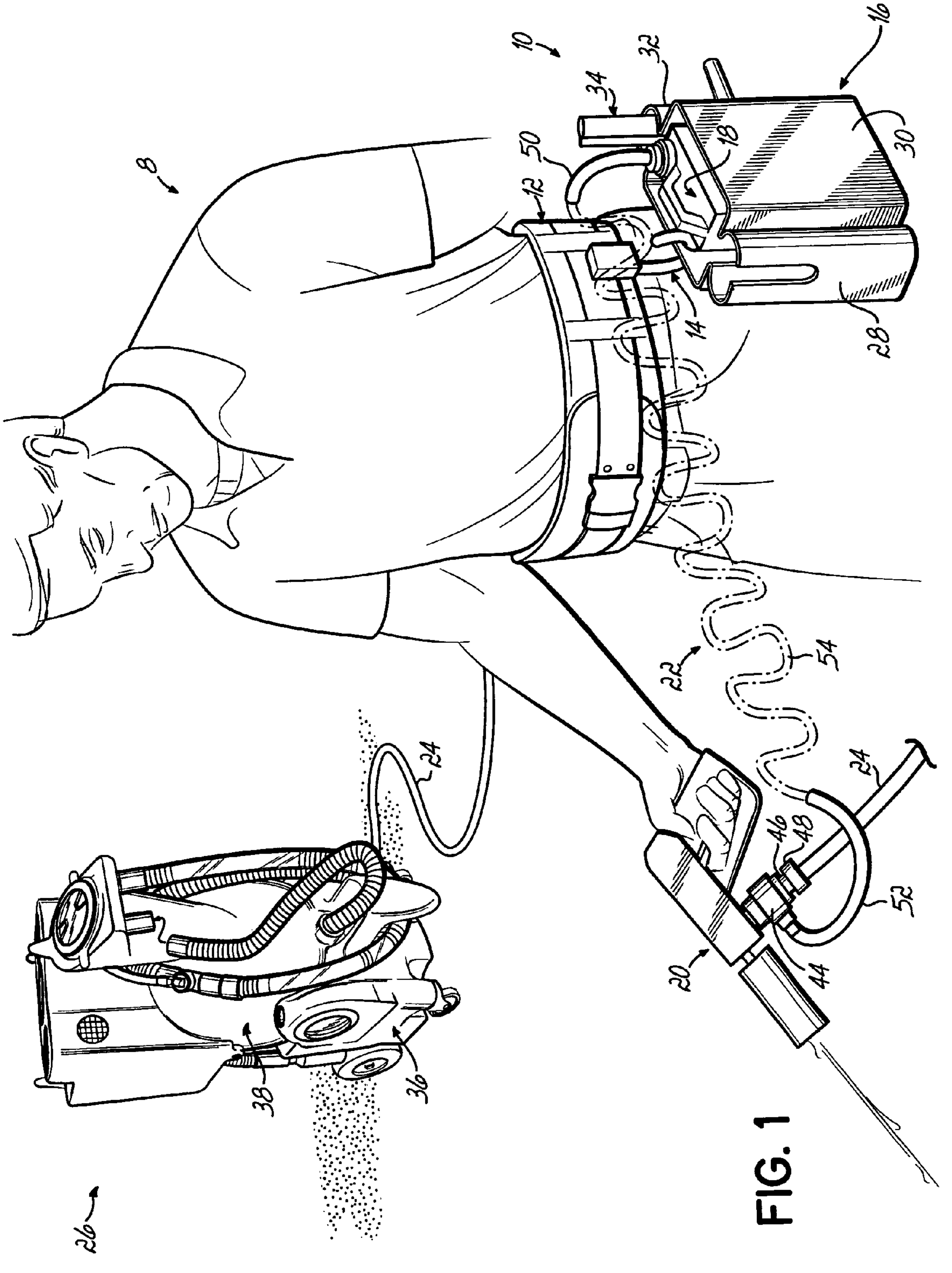
FIG. 1 is a perspective view of one embodiment of a cleaning system, in accordance with the principles of the invention.

With reference to FIG. 1, an operator 8 is using a particular cleaning system 10 in accordance with the principles of the invention. In the particular embodiment shown, the cleaning system 10 includes an operator wearable torso belt 12, a pivotable hook 14 fastened to the belt 12, and a holder 16 releasably hung on the hook 14. The particular cleaning system 10 further includes a container 18 for holding a liquid chemical or chemical mixture, a spray gun 20, a chemical draw line 22 connecting the chemical container 18 to the spray gun 20, and a liquid supply line 24 extending from a multi-functional cleaning machine 26 to the spray gun 20.

Figure 2:
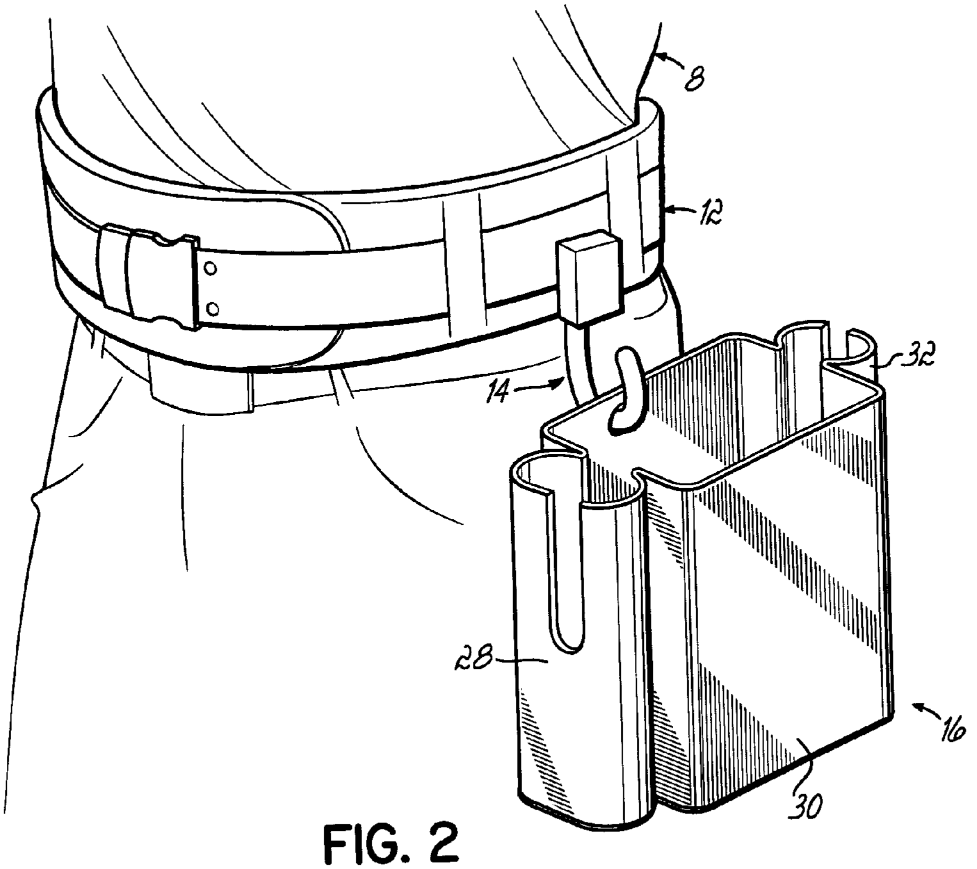
FIG. 2 is a perspective view of several of the components of the cleaning system shown in FIG. 1.

With reference to FIGS. 1 and 2, the liquid chemical holder 16 includes a first compartment 28, a second compartment 30, and a third compartment 32. When the operator 8 is not using the spray gun 20, the first compartment 28 may be used to releasably hold the spray gun 20. When the spray gun 20 is releasably positioned in the holder 16, neither the chemical draw line 22 nor the liquid supply line 24 needs to be disconnected. Accordingly, when the operator 8 is ready to use the spray gun 20 again, they simply may remove the spray gun 20 from the first compartment 28, and begin to spray a particular surface as desired. The second compartment 30 of the holder 16 is constructed and arranged to releasably hold a conventional chemical concentrate container, for example, the container 18. The container 18 may include a length of tubing (not shown) that extends from the container top into the container interior, and toward the container interior bottom wall. The particular compartment illustrated in FIGS. 1 and 2 happens to be optimally sized for a standard half gallon container. However, as will be appreciated, the second compartment 30 may have any desired size. The third compartment 32 of the holder 16 is shaped so as to releasably hold a squeegee 34 (FIG. 1).

Figure 3:
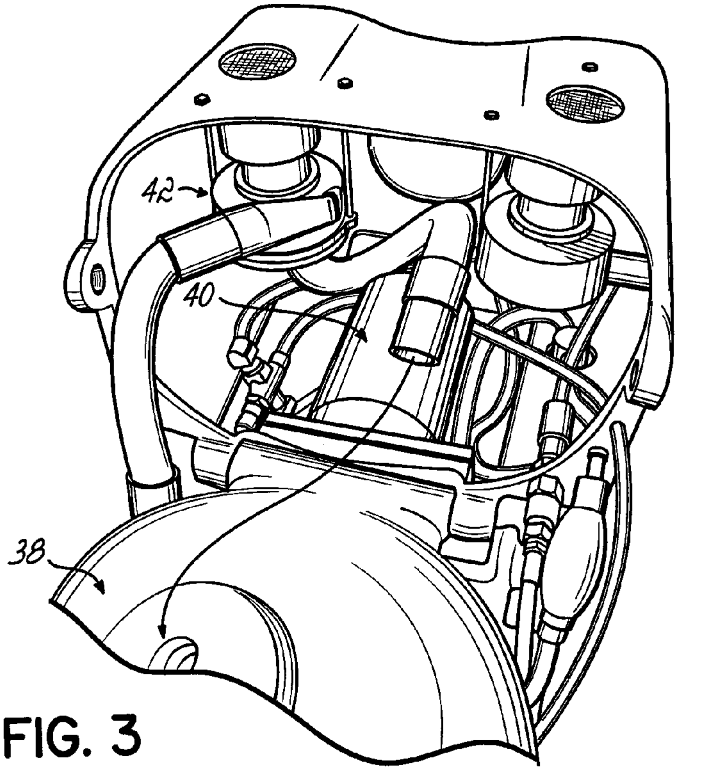
FIG. 3 is a perspective view of the motor housing of the machine of the cleaning system shown in FIG. 1.

With reference to FIGS. 1 and 3, the multi-functional cleaning machine 26 includes a fresh liquid tank 36, a waste recovery tank 38, a pump 40 for pumping a liquid from the fresh liquid tank 36 into and through the liquid supply line 24, and a vacuum assembly 42 for enabling a soil-containing fluid to be vacuumed into the waste recovery tank 38. Examples of suitable multi-functional cleaning machines include the KaiVac® machine and the KaiZen™ machine, both commercially available from Kaivac, Inc. of Hamilton, Ohio. The KaiVac® machine is disclosed in Robinson U.S. Pat. No. 6,206,980, the entire disclosure of which is incorporated into this patent document by reference. The KaiZen™ machine is disclosed in Robinson U.S. patent application Ser. No. 10/685,259, entitled "Ergonomic Multi-Functional Cleaning Machine" and filed on Oct. 14, 2003, now U.S. Pat. No. 7,272,869. The entire disclosure of U.S. Pat. No. 7,272,869 is incorporated into this patent document by reference.

With reference to FIG. 1, various liquid flow related fittings, connectors, and conduits are described in greater detail below. For example, a chemical injector fitting 44 is fastened to the liquid inlet (not numbered) of the spray gun 20, and a male quick disconnect member 46 is attached to the fresh liquid inlet end (not numbered) of the chemical injector fitting 44. In addition, the outermost end (not numbered) of the liquid supply line 24 includes a corresponding female quick disconnect member 48, so that the spray gun 20 and liquid supply line 24 easily may be releasably and fluidly attached to one another. The chemical injector fitting 44 further includes a male inlet port (not shown) for fluid connection to the chemical draw line 22.

With reference to FIG. 1, the chemical draw line 22 includes a first length of tubing 50 extending from the container 18, a second length of tubing 52 extending from the male inlet port (not shown) on the sidewall (not numbered) of the chemical injector fitting 44, and a length of coiled tubing 54 fluidly connecting the first and second lengths 50, 52. Advantageously, a reducing connector fitting (not shown) may be used to assist in maintaining the connection between each end of the coiled tubing 54 and the corresponding end of the first or second length of tubing 50, 52.

In use, and with reference to FIG. 1, the liquid supply line 24 and the chemical draw line 22 may be connected to the spray gun 20. Also, the operator 8 may activate the pump 40 of the multi-functional cleaning machine 26, by, for example, activating a switch (not shown) on a control panel (not shown) or the like of the machine 26. In this fashion, when an operator 8 uses the spray gun 20 in a low pressure mode, a cleaning liquid concentrate or other material from the container 18 is drawn through the chemical draw line 22 and into the chemical injector 44, where it is mixed with liquid from the liquid supply line 24. Accordingly, an operator 8 may spray a dilute solution of a cleaning chemical or other material being held in the container 18. Alternatively, if the operator 8 uses the spray gun 20 in its high pressure mode, the chemical injector 44 does not draw from the chemical draw line 22 and container 18. Instead, the spray gun 20 receives only liquid from the liquid supply line 24. In this fashion, an operator 8 may use the spray gun 20 in a rinse mode, for example.

Figure 4:
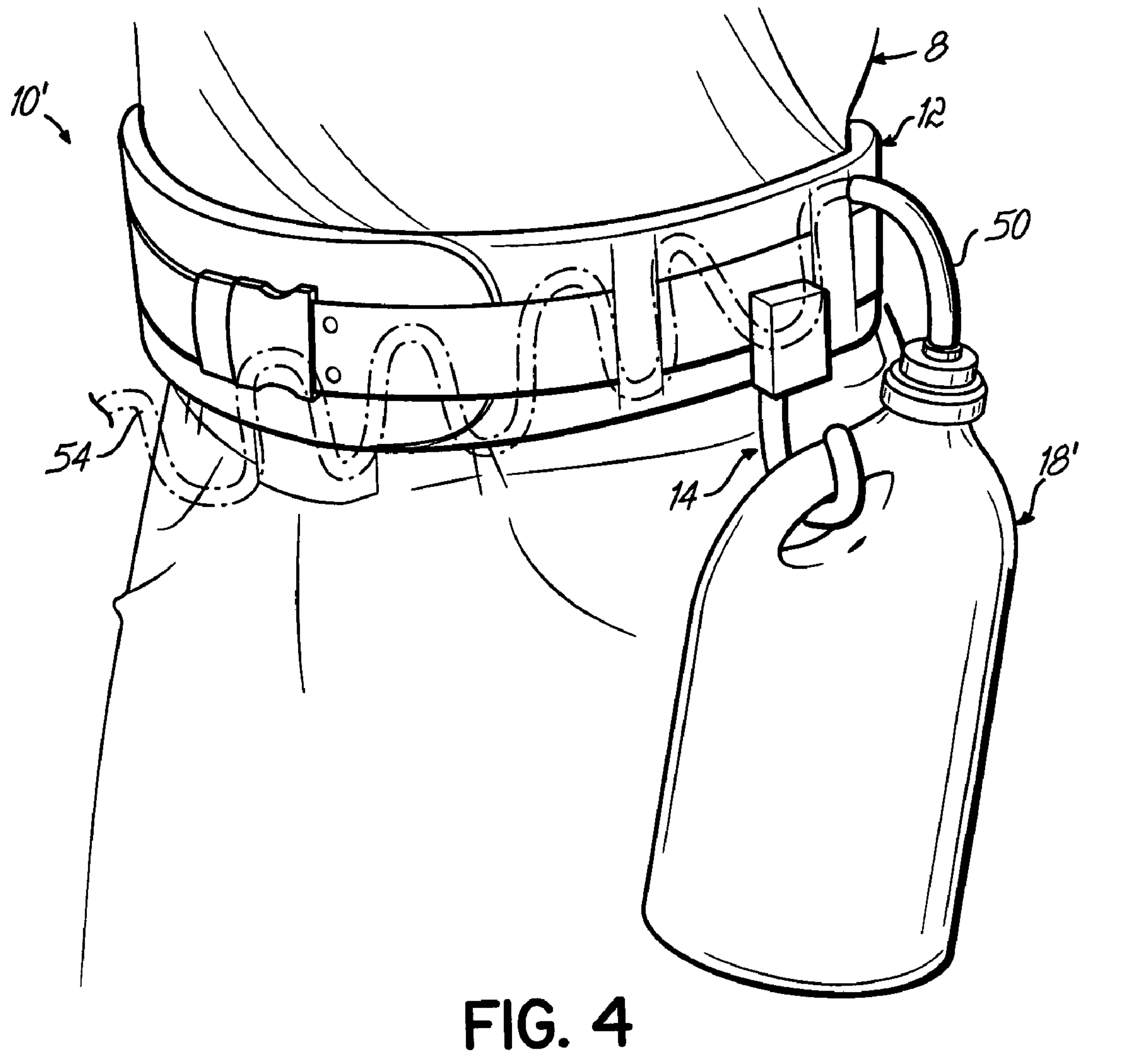
FIG. 4 is a perspective view of a portion of another embodiment of the cleaning system, in accordance with the principles of the invention.

With reference to FIG. 4, in another embodiment, a cleaning system 10' may include a torso belt 12, a swivel hook 14 connected to the torso belt 12, and a container 18' of a cleaning chemical concentrate or the like releasably positioned directly on the hook 14. The cleaning system 10' of FIG. 4 also may include many of the components illustrated in FIGS. 1 and 3 and described above. For example, as shown in FIG. 4, a portion of the chemical draw line 22 in the form of a first length of tubing 50 and a portion of the coiled tubing 54 is shown. As will be appreciated with reference to FIGS. 1 and 4, the coiled tubing 54 may be connected to a second length of tubing 52 and to a spray gun 20 via a chemical injector fitting 44. Also, the spray gun 20 may be connected to a pressurized source of a fresh liquid (e.g., water) via a liquid supply line 24. And, if desired, the pressurized source of liquid may be a cleaning machine such as the multi-functional cleaning machine 26 shown in FIG. 1.

Cleaning systems, in accordance with the principles of the invention, offer several benefits and advantages. For example, even though an operator may be thirty or forty feet or more away from the source of pressurized liquid (e.g., a multi-functional cleaning machine), the chemical container remains at the operator's side. Therefore, the chemical draw line is relatively short. Accordingly, when a user operates the spray gun in a low pressure chemical injection mode, it takes even less time for a cleaning chemical or the like to move from the container, through the draw line, to the spray gun. In addition, when the operator switches to the high pressure mode, it takes very little time for the operator to flush any cleaning chemical from the interior chamber or chambers of the spray gun. These benefits result in other advantages as well. For example, an operator may be even more productive because of the reduced amount of time to flush a chemical from the spray gun. Also, because the chemical injector fitting is at the base of the spray gun (as opposed to, for example, a position located on a multi-functional cleaning machine), an operator is able to use less water or other liquid from the fresh liquid source when flushing chemical from the spray gun. In this fashion, less water is consumed from the fresh liquid source, and less water needs to be squeegeed or vacuumed up—all of which results in greater worker productivity and cost savings.

While the present invention has been illustrated by a description of embodiments, and while the illustrative embodiments have been described in considerable detail, it is not the intention of the inventor to restrict or in any way limit the scope of the appended claims to such detail. Additional advantages and modifications readily will appear to those skilled in the art. The invention, in its broader aspects, is therefore not limited to the specific details, representative apparatus and methods, and illustrative examples shown and described. Accordingly, departures may be made from such details without departing from the spirit or scope of the inventor's general inventive concept.

What is claimed is:

1. A method of cleaning with a cleaning system, comprising the steps of:

providing a cleaning system comprising: a fresh liquid tank, the fresh liquid tank containing water; a waste recovery tank; a fresh liquid pump operable to pump the water from the fresh liquid tank; a vacuum source for enabling a soil-containing fluid to be vacuumed into the waste recovery tank; a fresh liquid supply line fluidly connected to the fresh liquid tank and the fresh liquid pump, the fresh liquid supply line including an outer end; a spray gun/venturi chemical injector assembly comprising a spray gun assembly and a venturi chemical injector assembly at the spray gun assembly, the venturi chemical injector assembly including a fresh liquid inlet, a liquid cleaning chemical inlet, and an outlet, the outer end of the fresh liquid supply line fluidly connected to the spray gun/venturi chemical injector assembly; a liquid cleaning chemical container including an opening and containing a liquid cleaning chemical, the liquid cleaning chemical container wearable by an operator; a liquid cleaning chemical draw line including an inlet end and an outlet end, the inlet end fluidly connected to the opening of the liquid cleaning chemical container, and the outlet end fluidly connected to the liquid cleaning chemical inlet of the venturi chemical injector assembly, the liquid cleaning chemical draw line having a length sufficient to enable the operator to maneuver and use the spray gun for cleaning a surface when the operator is wearing the liquid cleaning chemical container; the spray gun assembly including a low-pressure setting in which the liquid cleaning chemical is drawn by suction into and through the venturi chemical injector assembly when the water is pumped into and through the spray gun, the spray gun assembly further including a high-pressure setting in which the liquid cleaning chemical is not drawn by suction into and through the venturi chemical injector assembly when the water is pumped into and through the spray gun;

wearing the liquid cleaning chemical container, whereby the liquid cleaning chemical container stays with the operator but the operator is not hand-carrying the liquid cleaning chemical container;

activating the spray gun in the low-pressure setting, and spraying a mixture of the water and the liquid cleaning chemical from the spray gun onto a surface being cleaned, the mixture formed at the spray gun/venturi chemical injector assembly, the liquid cleaning chemical supplied from the liquid cleaning chemical container worn by the operator; and activating the spray gun in the high-pressure setting, and spraying the water from the spray gun onto the surface being cleaned, the water sprayed from the spray gun having a pressure sufficiently high to provide a mechanical cleaning action on the surface being cleaned without damaging the surface being cleaned.

2. The method of claim 1 wherein the fresh liquid pump is rated at from about 200 pounds per square inch (PSI) to about 400 PSI.

3. The method of claim 1 wherein the surface being cleaned is a hard surface within an interior of a building.

4. The method of claim 3 wherein the hard surface is one or more of a floor, a wall, a divider, a door, a counter, and a bathroom fixture.

5. The method of claim 1 wherein the method steps are performed in a restroom, thereby cleaning the restroom.

6. The method of claim 1 including support structure operable to assist the operator in wearing the liquid cleaning chemical container.

7. The method of claim 6 wherein the support structure includes an operator-wearable torso belt.

8. The method of claim 7 wherein the support structure includes a fastener connected to the operator-wearable torso belt.

9. The method of claim 8 wherein the fastener includes a hook.

10. The method of claim 9 wherein the support structure includes a holder operable to hold the liquid cleaning chemical container, the holder adapted to be hung on the hook.

11. The method of claim 7 wherein the support structure includes a holder connectable to the operator-wearable torso belt and operable to hold the liquid cleaning chemical container.

12. A cleaning system comprising:

a fresh liquid tank operable to contain water;

a waste recovery tank;

a fresh liquid pump operable to pump the water from the fresh liquid tank;

a vacuum source for enabling a soil-containing fluid to be vacuumed into the waste recovery tank;

a fresh liquid supply line fluidly connected to the fresh liquid tank and the fresh liquid pump, the fresh liquid supply line including an outer end;

a spray gun/venturi chemical injector assembly comprising a spray gun assembly and a venturi chemical injector assembly at the spray gun assembly, the venturi chemical injector assembly including a fresh liquid inlet, a liquid cleaning chemical inlet, and an outlet, the outer end of the fresh liquid supply line fluidly connected to the spray gun/venturi chemical injector assembly;

a liquid cleaning chemical container including an opening, the liquid cleaning chemical container operable to contain a liquid cleaning chemical, the liquid cleaning chemical container wearable by an operator;

a liquid cleaning chemical draw line including an inlet end and an outlet end, the inlet end fluidly connected to the opening of the liquid cleaning chemical container, and the outlet end fluidly connected to the liquid cleaning chemical inlet of the venturi chemical injector assembly, the liquid cleaning chemical draw line having a length sufficient to enable the operator to maneuver and use the spray gun for cleaning a surface when the operator is wearing the liquid cleaning chemical container;

the spray gun assembly including a low-pressure setting in which the liquid cleaning chemical is drawn by suction into and through the venturi chemical injector assembly when the water is pumped into and through the spray gun, the spray gun assembly further including a high-pressure setting in which the liquid cleaning chemical is not drawn by suction into and through the venturi chemical injector assembly when the water is pumped into and through the spray gun, whereby the operator may wear the liquid cleaning chemical container, whereby the liquid cleaning chemical container stays with the operator but the operator does not hand-carry the liquid cleaning chemical container, whereby the operator may activate the spray gun in the low-pressure setting, and spray a mixture of the water and the liquid cleaning chemical from the spray gun onto a surface being cleaned, the mixture formed at the spray gun/venturi chemical injector assembly, the liquid cleaning chemical supplied from the liquid cleaning chemical container worn by the operator, and whereby the operator may activate the spray gun in the high-pressure setting, and spray the water from the spray gun onto the surface being cleaned, the water sprayed from the spray gun having a pressure sufficiently high to provide a mechanical cleaning action on the surface being cleaned without damaging the surface being cleaned.

13. The cleaning system of claim 12 wherein the fresh liquid pump is rated at from about 200 pounds per square inch (PSI) to about 400 PSI.

14. The cleaning system of claim 12 wherein the surface to be cleaned is a hard surface within an interior of a building.

15. The cleaning system of claim 14 wherein the hard surface is one or more of a floor, a wall, a divider, a door, a counter, and a bathroom fixture.

16. The cleaning system of claim 12 wherein the surface to be cleaned is a restroom surface.

17. The cleaning system of claim 12 including support structure operable to assist the operator in wearing the liquid cleaning chemical container.

18. The cleaning system of claim 17 wherein the support structure includes an operator-wearable torso belt.

19. The cleaning system of claim 18 wherein the support structure includes a fastener connected to the operator-wearable torso belt.

20. The cleaning system of claim 19 wherein the fastener includes a hook.

21. The cleaning system of claim 20 wherein the support structure includes a holder operable to hold the liquid cleaning chemical container, the holder adapted to be hung on the hook.

22. The cleaning system of claim 18 wherein the support structure includes a holder connectable to the operator-wearable torso belt and operable to hold the liquid cleaning chemical container.

* * * * *